United States Patent
Feichtenschlager et al.

(10) Patent No.: US 12,030,811 B2
(45) Date of Patent: Jul. 9, 2024

(54) RHEOLOGY MODIFIER FOR GEOPOLYMER FOAM FORMULATIONS

(71) Applicant: SIKA TECHNOLOGY AG, Baar (CH)

(72) Inventors: Bernhard Feichtenschlager, Trostberg (DE); Maxim Pulkin, Trostberg (DE); Sarunas Turcinskas, Trostberg (DE); Tatiana Mitkina, Trostberg (DE)

(73) Assignee: SIKA TECHNOLOGY AG, Baar (CH)

( * ) Notice: Subject to any disclaimer, the term of this patent is extended or adjusted under 35 U.S.C. 154(b) by 422 days.

(21) Appl. No.: 17/424,753

(22) PCT Filed: Jan. 29, 2020

(86) PCT No.: PCT/EP2020/052153
§ 371 (c)(1),
(2) Date: Jul. 21, 2021

(87) PCT Pub. No.: WO2020/157123
PCT Pub. Date: Aug. 6, 2020

(65) Prior Publication Data
US 2022/0119311 A1    Apr. 21, 2022

(30) Foreign Application Priority Data
Jan. 29, 2019  (EP) .................................. 19154091

(51) Int. Cl.
*C04B 24/26*    (2006.01)
*C04B 28/26*    (2006.01)

(52) U.S. Cl.
CPC .......... *C04B 24/2611* (2013.01); *C04B 28/26* (2013.01)

(58) Field of Classification Search
CPC ... C04B 24/2611; C04B 28/26; C04B 28/006; C04B 24/2658; C04B 2103/0079; C04B 2103/302; C04B 2111/28; C04B 2111/52; Y02P 40/10; Y02W 30/91
See application file for complete search history.

(56) References Cited

U.S. PATENT DOCUMENTS

| | | |
|---|---|---|
| 8,349,960 B2 | 1/2013 | Gaeberlein et al. |
| 8,846,784 B2 | 9/2014 | Gaeberlein et al. |
| 2016/0244366 A1 | 8/2016 | Turcinskas et al. |

FOREIGN PATENT DOCUMENTS

| | | | | |
|---|---|---|---|---|
| CN | 105683120 A | * | 6/2016 | .......... C04B 12/005 |
| JP | 2016-534965 A | | 11/2016 | |
| WO | 0210229 A1 | | 2/2002 | |
| WO | 2005090424 A1 | | 9/2005 | |
| WO | 2015043805 A1 | | 4/2015 | |
| WO | 2015062860 A1 | | 5/2015 | |
| WO | 2017174560 A1 | | 10/2017 | |

OTHER PUBLICATIONS

International Search Report for PCT/EP2020/052153 dated Apr. 20, 2020.
Written Opinion for PCT/EP2020/052153 dated Apr. 20, 2020.

* cited by examiner

*Primary Examiner* — Anthony J Green
(74) *Attorney, Agent, or Firm* — Oliff PLC

(57) ABSTRACT

The present invention relates to the use of a cationic copolymer as a rheology modifier in a geopolymer foam formulation, a geopolymer foam formulation comprising a cationic copolymer, a process for preparing a geopolymer foam, a geopolymer foam comprising a cationic copolymer and composition for preparing a geopolymer foam formulation.

16 Claims, No Drawings

RHEOLOGY MODIFIER FOR GEOPOLYMER FOAM FORMULATIONS

CROSS REFERENCE TO RELATED APPLICATIONS

This application is a national stage application of International Application No. PCT/EP2020/052153, filed Jan. 29, 2020, which claims priority from European Patent Application No. 19154091.3, filed Jan. 29, 2019, both of which applications are incorporated herein by reference.

The present invention relates to the use of a cationic copolymer as a rheology modifier in a geopolymer foam formulation, a geopolymer foam formulation comprising a cationic copolymer, a process for preparing a geopolymer foam, a geopolymer foam comprising a cationic copolymer and composition for preparing a geopolymer foam formulation.

Geopolymer foams can be used as insulation material, e.g., as a thermal insulator, acoustic insulator or acoustic absorber as well as construction material with a low density. In contrast to foams based on organic polymers, this material is eco-friendly, robust, and non-flammable. The latter may also open up applications in the field of fire protection. Foams in general can be stabilized by use of surfactants or particles.

Generally the process of producing geopolymer foams is basically in two steps, a first step in which the fresh foam is mixed and mechanical energy is employed to the fresh foam and a second step in which the freshly prepared foam is allowed to harden. In the second step the fresh foam is typically left alone without mixing until the hardening of the foams begins. It is important that in the first step the foaming process can be done smoothly (good workability and foamability) and in the second step the foams should stay stable, which means that the foam should not (partially) collapse or become inhomogeneous until the binder system starts to harden. It is for example particularly disadvantageous if the fresh geopolymer foam is still relatively flowable when the geopolymer foam is applied on vertical surfaces, as well as when open cavities are filled with the geopolymer foam, because the foams may just simply flow away and will not stay at the intended application place (besides problems of foam collapsing and possibly becoming inhomogeneous). As a summary, during the first step a relatively low viscosity of the aqueous suspension system is required in order to guarantee a good foamability and workability, whereas in the second step the viscosity should become relatively high in order to guarantee the stability of the foams. What is required in the end, is a thixotropic behavior of the geopolymer foams.

Furthermore it is often a problem that a cracking of the hardened samples occurs, which may be induced by shrinkage of the hardened samples. It is needed to avoid or reduce the cracking of the hardened samples in order to avoid a negative influence on the mechanical and insulation properties.

It is an object of the invention to provide foaming systems with thixotropic properties in order to achieve the before mentioned effects, particularly in order to allow for a good workability of the geopolymer foams during the foaming process (during mixing) and a good stability of the foams during the quiet period after mixing until hardening sets on. Furthermore it is an object of the invention to avoid as far as possible the crack formation of the hardened geopolymer foams.

WO 2015/062860 relates to a geopolymer foam formulation, wherein said formulation can additionally comprise inter alia additives for foam stabilization. It is discloses that for foam stabilization it is possible to use additives from the group consisting of fumed silica, proteins, rheology-modifying agents, e.g. starches (inter alia xanthan gum, diutan gum), modified starches, poly(meth)acrylates and -(meth) acrylamides bearing sulpho and/or quaternized ammonium groups and mixtures thereof. Poly(meth)acrylates and -acrylamides bearing sulpho groups and/or bearing quaternized ammonium groups are described in WO 2008/151878 A1, WO 2007/017286 A1, WO 2005/090424 A1 and WO 02/10229 A1. (Co)polymers of this type are also termed superabsorbing polymers (SAPs) or salt-insensitive superabsorbing polymers (SISAs). Materials involved are generally rheology-modifying agents, and thickeners and, respectively, water-retention agents.

WO2015043805 relates to cationic copolymers, a process for the production of these cationic copolymers and the use of these cationic copolymers as dispersants for geopolymer binder systems.

It has surprisingly been found that the above objects can be achieved by the present invention, which is described hereinafter. In particular, it has been found that by using at least one cationic copolymer (i) according the present invention as a rheology modifier in a geopolymer foam formulation geopolymer foams with a good workability during the foaming process (mixing) can be obtained. The viscosity of the system at this stage is relatively low. After the foaming process (mixing) the freshly prepared foams are stable, they do not collapse, stay homogeneous and do not flow away in an uncontrolled manner, which is due to a relatively high viscosity of the freshly prepared foam after the mixing process.

The rheology modifiers of this invention in the form of the cationic copolymer (i) allow the reduction of water in the foaming system. The rheology modifiers of this invention in the form of the cationic copolymer (i) also allow the introduction of thixotropic properties in the foaming system. The rheology modifiers act also as a thixotropic agent. Preferably the term rheology modifier means water reducer and/or thixotropic agent.

In one embodiment, the present invention is directed to the use of at least one cationic copolymer (i) as a rheology modifier in a geopolymer foam formulation, wherein the cationic copolymer (i) comprises
  at least one structural unit (I) comprising at least one cationic group, and optionally
  at least one macromonomeric structural unit (II) comprising at least one polyoxyalkylene group.

Furthermore, in the case of a mandatory incorporation of at least one structural unit (II) comprising at least one polyoxyalkylene group in the at least one cationic copolymer (i), a more cost-efficient cationic copolymer (i) can be obtained, resulting in cost-efficient geopolymer foams with good workability and good stability, the advantageous rheology modifying effect is maintained. In other words, it has been found that the cationic copolymer (i) according to the present invention, which comprises polyoxyalkylene groups, exhibits the desired rheology modifying effect, while having less cationic groups (lower mol fraction of the cationic monomers) and thus, being more cost-efficient.

In another embodiment, the present invention is directed to a geopolymer foam formulation comprising at least one cationic copolymer (i) according to the present invention, and (ii) at least one inorganic binder mixture comprising
   (iia) at least one inorganic binder selected from the group consisting of latent hydraulic binders, pozzolanic binders and mixtures thereof, and
   (iib) at least one alkaline activator selected from the group consisting of alkali metal hydroxides, alkali metal carbonates, alkali metal aluminates, alkali metal silicates, and mixtures thereof; and
(iii) water.

In yet another embodiment, the present invention is directed to a process for preparing a geopolymer foam comprising
(1) preparing a geopolymer foam formulation according to the present invention by mixing the at least one cationic copolymer (i) with
   (ii) the at least one inorganic binder mixture comprising
      (iia) at least one inorganic binder selected from the group consisting of latent hydraulic binders, pozzolanic binders and mixtures thereof, and
      (iib) at least one alkaline activator selected from the group consisting of alkali metal hydroxides, alkali metal carbonates, alkali metal aluminates, alkali metal silicates, and mixtures thereof;
   (iii) water; and
   (iv) optionally at least one additive; and
(2) foaming of the resulting geopolymer foam formulation by chemical, physical and/or mechanical foaming.

In yet another embodiment, the present invention is directed to a geopolymer foam obtainable by the process according to the present invention.

In yet another embodiment, the present invention is directed to a geopolymer foam comprising at least one cationic copolymer (i) according to the present invention;
(ii) at least one inorganic binder mixture comprising
   (iia) at least one inorganic binder selected from the group consisting of latent hydraulic binders, pozzolanic binders and mixtures thereof, and
   (iib) at least one alkaline activator selected from the group consisting of alkali metal hydroxides, alkali metal carbonates, alkali metal aluminates, alkali metal silicates, and mixtures thereof; and
(iii) water.

In yet another embodiment, the present invention is directed to a composition for preparing a geopolymer foam formulation comprising as components at least one cationic copolymer
(i) according to the present invention; and
(ii) at least one inorganic binder mixture comprising
   (iia) at least one inorganic binder selected from the group consisting of latent hydraulic binders, pozzolanic binders and mixtures thereof, and
   (iib) at least one alkaline activator selected from the group consisting of alkali metal hydroxides, alkali metal carbonates, alkali metal aluminates, alkali metal silicates, and mixtures thereof;
wherein
the components are present separately; or
the components are present in a mixture.

The present invention is also directed to the use of at least one cationic copolymer (i) as a crack reducing agent in a geopolymer foam formulation, wherein the cationic copolymer (i) comprises at least one cationic structural unit (I) comprising at least one cationic group, and optionally at least one macromonomeric structural unit (II) comprising at least one polyoxyalkylene group.

Preferably the monomeric component (A) forming the structural unit (I) of the cationic copolymer (i) is selected from the group consisting of ethylenically unsaturated monomers, which comprise the at least one cationic group, and wherein a monomeric component (B) forming the structural unit (II) of the cationic copolymer (i) is selected from the group consisting of ethylenically unsaturated monomers, which comprise the at least one polyoxyalkylene group. Preferably the at least one cationic group is a quaternary ammonium group, an iminium group or an N-alkylated heteroaryl group.

Preferably the cationic copolymer (i) for use as a crack reducing agent comprises
a) 3 to 97 mol-% of a cationic structural unit of formula (I)

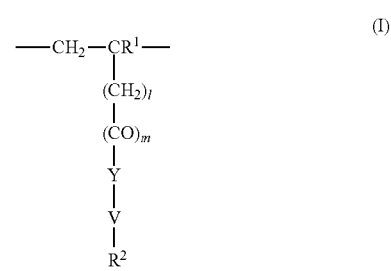

wherein
R¹ in each occurrence is the same or different and represents hydrogen and/or methyl
R² in each occurrence is the same or different and is selected from the group consisting of

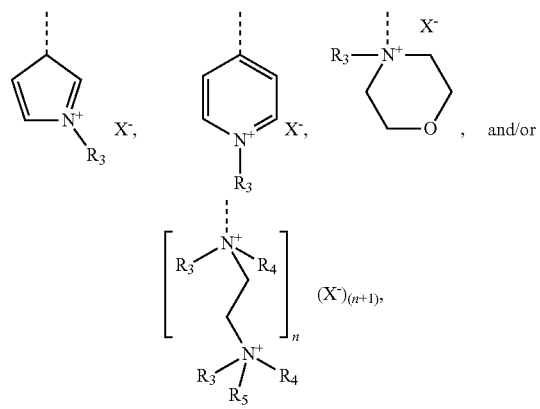

wherein
R³, R⁴, and R⁵ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety,
l in each occurrence is the same or different and represents an integer from 0 to 2,
m in each occurrence is the same or different and represents 0 or 1,
n in each occurrence is the same or different and represents an integer from 0 to 10,
Y in each occurrence is the same or different and represents an absent group, oxygen, NH, and/or NR³,
V in each occurrence is the same or different and represents —(CH₂)$_x$—,

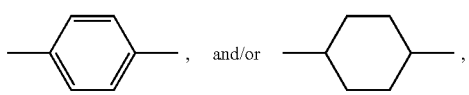

wherein x in each occurrence is the same or different and represents an integer from 1 to 6, and X in each occurrence is the same or different and represents a halogen atom, a $C_1$-$C_4$-alkyl sulfate, a $C_1$-$C_4$-alkyl sulfonate, a $C_6$-$C_{14}$-(alkyl)aryl sulfonate and/or a monovalent equivalent of a polyvalent anion, which is selected from a sulfate, a disulfate, a diphosphate, a triphosphate, and/or a polyphosphate; and optionally b) 97 to 3 mol-% of a macromonomeric structural unit of formula (II)

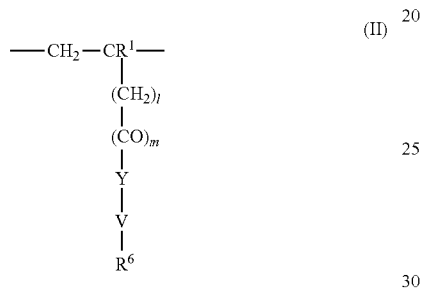

wherein $R^6$ in each occurrence is the same or different and represents a polyoxyalkylene group of the following formula (IIa)

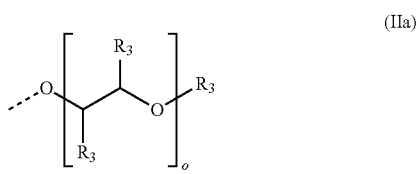

wherein o in each occurrence is the same or different and represents an integer from 1 to 300, and $R^1$, $R^3$, l, m, Y, V, and x have the meanings given above.

Preferably the cationic copolymer (i) for use as a crack reducing agent comprises a) 3 to 97 mol-% of a cationic structural unit of formula (I)

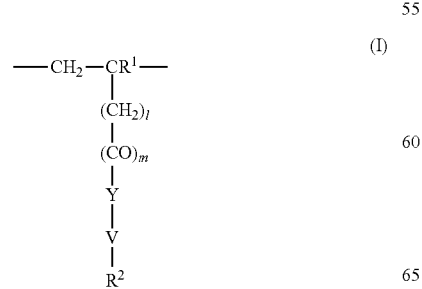

wherein $R^1$ in each occurrence is the same or different and represents hydrogen and/or methyl, $R^2$ in each occurrence is the same or different and is selected from the group consisting of

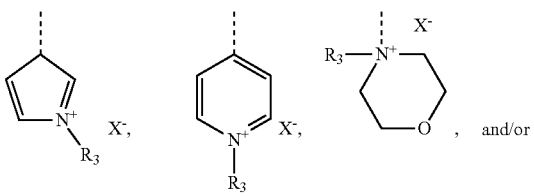

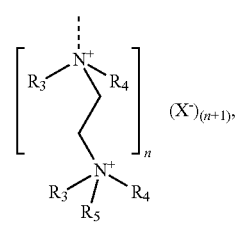

wherein $R^3$, $R^4$, and $R^5$ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety, l in each occurrence is the same or different and represents an integer from 0 to 2, m in each occurrence is the same or different and represents 0 or 1, n in each occurrence is the same or different and represents an integer from 0 to 10, Y in each occurrence is the same or different and represents an absent group, oxygen, NH, and/or $NR^3$, V in each occurrence is the same or different and represents —$(CH_2)_x$—,

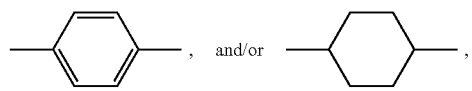

wherein x in each occurrence is the same or different and represents an integer from 0 to 6, and X in each occurrence is the same or different and represents a halogen atom, a $C_1$-$C_4$-alkyl sulfate, a $C_1$-$C_4$-alkyl sulfonate, a $C_6$-$C_{14}$-(alkyl)aryl sulfonate and/or a monovalent equivalent of a polyvalent anion, which is selected from a sulfate, a disulfate, a diphosphate, a triphosphate, and/or a polyphosphate; and optionally b) 97 to 3 mol-% of a macromonomeric structural unit of formula (II)

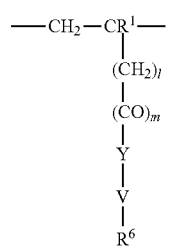

(II)

wherein
$R^6$ in each occurrence is pyrrolidone and/or caprolactam, and l, m, Y and V are 0 or absent groups.

Preferably the at least one cationic copolymer (i) for use as a crack reducing agent comprises 10 to 90 mol.-% of the cationic structural unit (I) and 90 to 10 mol.-% of the macromonomeric structural unit (II), preferably 25 to 75 mol.-% of the cationic structural unit (I) and 75 to 25 mol.-% of the macromonomeric structural unit (II), more preferably 40 to 60 mol.-% of the cationic structural unit (I) and 60 to 40 mol.-% of the macromonomeric structural unit (II).

In the context of the present invention, the following definitions are relevant.

The term "wt.-%" or "% by weight" (also called mass fraction) denotes the percentage of the respective component in relation to the sum of all components by weight, unless otherwise stated. The term "vol.-%" or "% by volume" refers to the percentage of each component in proportion to the sum of all components by volume, unless otherwise specified. Furthermore, the sum of all percentages of the specified and unspecified components of a composition is always 100%.

The term "comprising" means that in addition to the specific features mentioned further, not specifically mentioned features may be present. Likewise, the term "containing" is to be understood. The term "consisting of" means that only the specific features mentioned are included.

The term "forming" in the context of polymers means the formation by radical copolymerization.

In general, it is distinguished between the terms "geopolymer foam formulation" and "geopolymer foam". The geopolymer foam formulation may be obtained from a suitable composition for preparing a geopolymer foam formulation as defined herein by adding water and optionally at least one additive. The geopolymer foam formulation may then be used to pre-pare a geopolymer foam by mechanical, physical or chemical foaming. The freshly prepared geopolymer foam is to be distinguished from the hardened geopolymer foam, i.e. the cellular material, which is obtainable from the freshly prepared geopolymer foam by hardening and optionally drying. Unless otherwise indicated, the term "geopolymer foam" as used herein refers to the freshly prepared geopolymer foam, and the term "cellular material" refers to the hardened and optionally dried geopolymer foam.

For the purpose of the present invention, the terms "cationic polymer" and "cationic copolymer" are used interchangeable.

Geopolymer foams are three-phase systems, wherein one phase is gaseous, one phase is liquid, and one phase is solid. Thus, it is to be understood that the geopolymer foam comprises a gas. The gaseous phase is present as fine gas bubbles separated by cell walls obtained from the liquid and solid phases. The cell walls meet each other at edges, which meet each other at nodes, thereby forming a framework. The content of the gaseous phase in the geopolymer foam may vary in a range of from 20 to 99%, preferably from 50 to 98% by volume. The liquid phase is preferably an aqueous phase, so that the geopolymer foam typically also comprises water. However, the water may be partly removed upon drying. The solid phase of a geopolymer foam comprises an inorganic binder. Geopolymer foams can be open-cell foams or closed-cell foams. In closed-cell foams, the gas is completely sur-rounded by the cell wall. Typically, at the same density, closed-cell foams are more robust than open-cell foams. Accordingly, closed cell foams are preferred due to their improved mechanical stability.

Cellular materials can be obtained from geopolymer foams by hardening and optionally drying a geopolymer foam.

The term "water" as used herein may refer to pure, deionized water or water with up to 0.1% by weight impurities and/or salts, such as normal tap water.

The gas phase present in the foam can be introduced by mechanical, physical or chemical foaming. Non-limiting examples of gases comprise air, nitrogen, noble gas, carbon dioxide, hydrocarbons, hydrogen, oxygen, and mixtures thereof.

The gas phase present in the foam can be introduced by mechanical foaming in the presence of the respective gas. Mechanical foaming may be performed by using a mixer, or by an oscillating process, or by a stator-rotor process.

The gas phase can also be introduced into the foam by physical or chemical foaming, wherein the physical or chemical foaming process is suitable to liberate a gas. Preferably, blowing agents are used, which evaporate, decompose or react with water and/or an acid, so as to liberate the gas. Non-limiting examples of blowing agents are peroxides, such as hydrogen peroxide, dibenzylperoxide, peroxobenzoic acid, peroxoacetic acid, alkali metal peroxides, perchloric acid, peroxomonosulfuric acid, dicumyl peroxide or cumyl hydroperoxide; isocyanates, carbonates and bicarbonates, such as $CaCO_3$, $Na_2CO_3$, and $NaHCO_3$, which are preferably used in combination with an acid, e.g., a mineral acid; metal powders, such as aluminum powder; azides, such as methyl azide; hydrazides, such as p-toluenesulfonyl-hydrazide; hydrazine.

Chemical foaming can be facilitated by the use of a catalyst. Suitable catalysts preferably comprise $Mn^{2+}$, $Mn^{4+}$, $Mn^{7+}$ or $Fe^{3+}$ cations. Alternatively, the enzyme catalase may be used as catalyst. Non-limiting examples of suitable catalysts are $MnO_2$ and $KMnO_4$. Such catalysts are preferably used in combination with peroxide blowing agents.

The preferred embodiments of the invention will be explained below. The preferred embodiments are preferred alone and in combination with each other.

As already stated above, the present invention is directed to the use of at least one cationic copolymer (i) as a rheology modifier in a geopolymer foam formulation, wherein the cationic copolymer (i) comprises
  at least one structural unit (I) comprising at least one cationic group, and optionally
  at least one macromonomeric structural unit (II) comprising at least one polyoxyalkylene group.

In a preferred embodiment, the monomeric component (A) forming the structural unit (I) of the cationic copolymer (i) is selected from the group consisting of ethylenically unsaturated monomers, which comprise the at least one cationic group, and
the monomeric component (B) forming the structural unit (II) of the cationic copolymer (i) is selected from the group consisting of ethylenically unsaturated monomers, which comprise the at least one polyoxyalkylene group.

Preferably, the at least one cationic group is a quaternary ammonium group, an iminium group or an N-alkylated heteroaryl group.

The cationic monomer (A) is preferably selected from quaternized N-vinylimidazole (1), quaternized N-allylimidazole (2), quaternized 4-vinylpyridine (3), quaternized 1-[2-(acryloyl-oxy)ethyl]-1H-imidazole (4), 1-[2-(methacryloyloxy)ethyl]-1H-imidazole (5), and mixtures thereof. A graphical representation of these preferred cationic monomers (in non-quaternized form) is given hereinbelow:

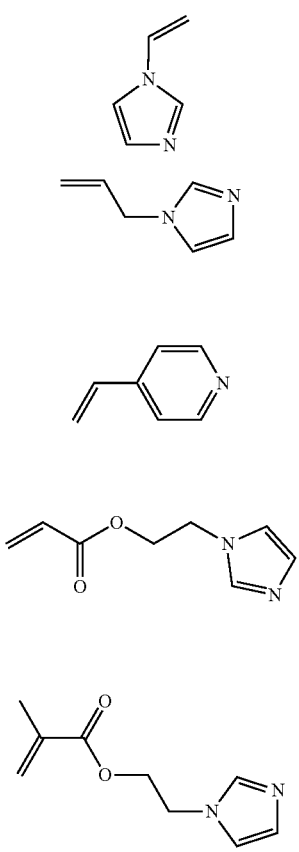

The cationic monomer (B) further comprises at least one macromonomeric structural unit (II) comprising at least one polyoxyalkylene group (IIa). Preferred polyoxyalkylene groups include polyoxyethylene groups, polyoxypropylene groups, and combinations thereof. In particular, the oxyalkylene units of the polyoxyalkylene group is preferably selected from ethylene oxide groups and/or propylene oxide groups, which may be arranged randomly, alternatingly, graduatedly and/or blockwise within the polyoxyalkylene group.

In yet another preferred embodiment, the at least one polyoxyalkylene group (IIa) is a polyoxyethylene or a polyoxypropylene group, and/or wherein each polyoxyalkylene group (IIa) comprises from 1 to 300, preferably from 5 to 300, more preferably from 10 to 200, and in particular from 20 to 100 oxyalkylene units.

In another embodiment the cationic copolymer (i) comprises a) 3 to 97 mol-% of a cationic structural unit of formula (I)

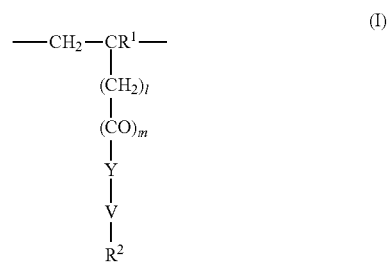

wherein
R$^1$ in each occurrence is the same or different and represents hydrogen and/or methyl,
R$^2$ in each occurrence is the same or different and is selected from the group consisting of

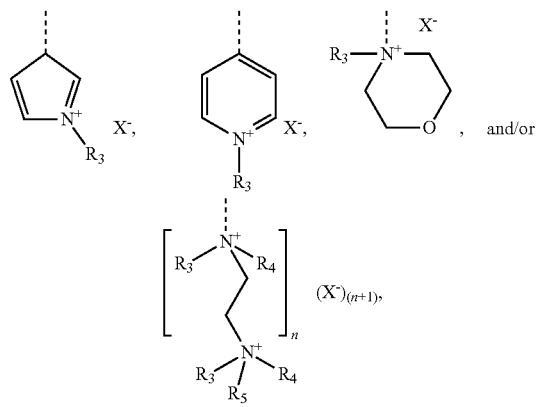

wherein
R$^3$, R$^4$, and R$^5$ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety,
l in each occurrence is the same or different and represents an integer from 0 to 2,
m in each occurrence is the same or different and represents 0 or 1,
n in each occurrence is the same or different and represents an integer from 0 to 10,
Y in each occurrence is the same or different and represents an absent group, oxygen, NH, and/or NR$^3$,
V in each occurrence is the same or different and represents —(CH$_2$)$_x$—,

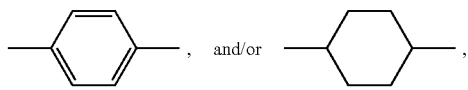

wherein
x in each occurrence is the same or different and represents an integer from 1 to 6, and
X in each occurrence is the same or different and represents a halogen atom, a C$_1$-C$_4$-alkyl sulfate, a C$_1$-C$_4$-alkyl sulfonate, a C$_6$-C$_{14}$-(alkyl)aryl sulfonate and/or a monovalent equivalent of a polyvalent anion, which is selected from a sulfate, a disulfate, a diphosphate, a triphosphate, and/or a polyphosphate; and optionally b) 97 to 3 mol-% of a macromonomeric structural unit of formula (II)

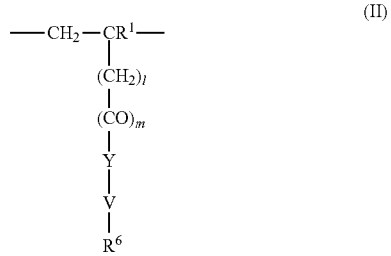

wherein

R⁶ in each occurrence is the same or different and represents a polyoxyalkylene group of the following formula (IIa)

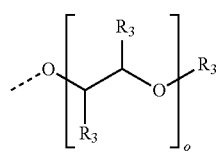

wherein in each occurrence is the same or different and represents an integer from 1 to 300, and R¹, R³, l, m, Y, V, and x have the meanings given above.

In another embodiment the cationic copolymer (i) comprises a) 3 to 97 mol-% of a cationic structural unit of formula (I)

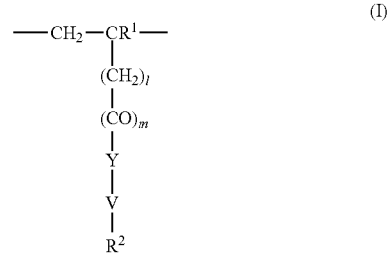

wherein

R¹ in each occurrence is the same or different and represents hydrogen and/or methyl, R² in each occurrence is the same or different and is selected from the group consisting of

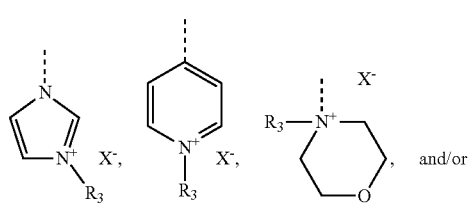

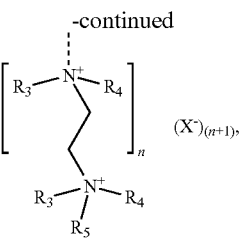

wherein

R³, R⁴, and R⁵ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety, l in each occurrence is the same or different and represents an integer from 0 to 2, m in each occurrence is the same or different and represents 0 or 1, n in each occurrence is the same or different and represents an integer from 0 to 10, Y in each occurrence is the same or different and represents an absent group, oxygen, NH, and/or NR³, V in each occurrence is the same or different and represents —(CH₂)ₓ—,

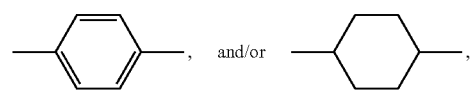

wherein x in each occurrence is the same or different and represents an integer from 0 to 6, preferably 0, provided that Y represents an absent group when x is 0, and X in each occurrence is the same or different and represents a halogen atom, a C₁-C₄-alkyl sulfate, a C₁-C₄-alkyl sulfonate, a C₆-C₁₄-(alkyl)aryl sulfonate and/or a monovalent equivalent of a polyvalent anion, which is selected from a sulfate, a disulfate, a diphosphate, a triphosphate, and/or a polyphosphate; and optionally b) 97 to 3 mol-% of a macromonomeric structural unit of formula (II)

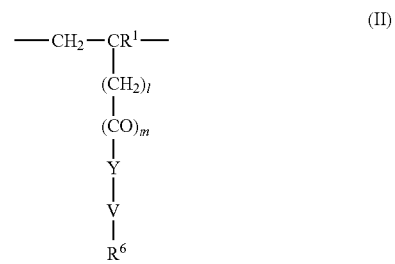

wherein

R⁶ in each occurrence is pyrrolidone and/or caprolactam, i.e. l, m, Y and V are 0 or absent groups.

In the context of the present invention, the term "pyrrolidone" encompasses 2-pyrrolidone and 3-pyrrolidone.

Preferably, the pyrrolidone and/or caprolactam are attached via the respective nitrogen atoms.

Exemplary structures of a macromonomeric structural unit of formula (II), wherein $R^6$ is pyrrolidone and/or caprolactam are as follows:

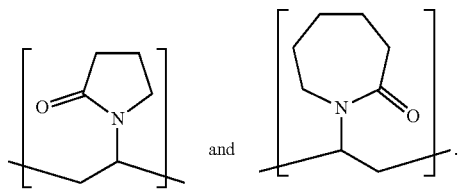

Exemplary structures of a cationic structural unit of formula (I) are as follows:

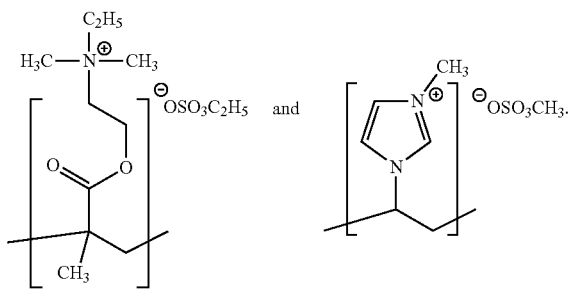

For the purpose of the present invention, a "cationic copolymer" is a copolymer having cationic groups (as side chains) attached to a polymeric "backbone" or main chain. In order to exhibit a sufficient electrostatic repulsion, the cationic copolymers of the invention also possess non-adsorbing polyoxyalkylene side chains, i.e. the polyoxyalkylene groups of formula (IIa). Thus, the cationic copolymers of the present invention form comb structures and may thus be referred to as comb polymers. Preferably, the structural units of formulas (I) and (II) may be arranged randomly, alternatingly, graduatedly and/or blockwise within the polymeric main chain.

In the cationic copolymer of the invention, the backbone of the monomeric components corresponding to the structural units of formulas (I) and (II) are preferably selected from vinyl ethers, vinyloxy $C_{1-6}$-alkyl ethers, in particular vinyloxy butyl ethers, allyl ethers, methallyl ethers, 3-butenyl ethers, isoprenyl ethers, acrylic esters, methacrylic esters, acrylamides, methacrylamides, and mixtures thereof. In other words, preferred backbones of the monomers corresponding to the structural units of formulas (I) and (II) include, but are not limited to, the following partial structures:

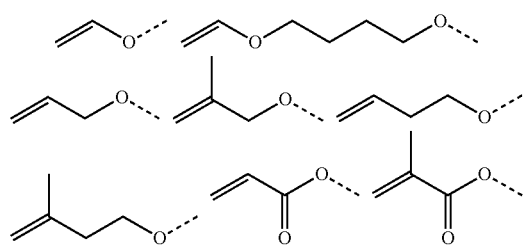

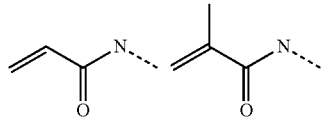

Acrylic esters, methacrylic esters, acrylamides, methacrylamides, and the like may be partially substituted by the corresponding unsaturated dicarboxylic acid derivatives such as maleic acid derivatives, provided that these do not possess free acid functionalities, and vinyl ethers and the like may be partially substituted by the corresponding diene derivatives, as long as these derivatives are radicalically copolymerizable.

In the cationic copolymer of the invention, "o" is preferably from 5 to 300, more preferably 10 to 200, and in particular 20 to 100.

In the cationic copolymer of the invention, the oxyalkylene units of the polyoxyalkylene group of formula (IIa) are preferably selected from ethylene oxide groups and/or propylene oxide groups, which may be arranged randomly, alternatingly, graduatedly and/or blockwise within the polyoxyalkylene group. Moreover, the polyoxyalkylene group of formula (IIa) is preferably a mixture with different values for "o" within the specified definition.

The cationic copolymer of the invention preferably comprises 10 to 90 mol-% of the cationic structural unit and 90 to 10 mol-% of the macromonomeric structural unit, more preferably 25 to 75 mol-% of the cationic structural unit and 75 to 25 mol-% of the macromonomeric structural unit and in particular 40 to 60 mol-% of the cationic structural unit and 60 to 40 mol-% of the macromonomeric structural unit.

The cationic copolymer has preferably a molecular weight in the range of from 1000 to 500000, more preferably 2000 to 150000 and particularly 4000 to 100000 g/mol.

The present invention is further directed to a geopolymer foam formulation comprising at least one cationic copolymer (i) according to the present invention, and (ii) at least one inorganic binder mixture comprising
   (iia) at least one inorganic binder selected from the group consisting of latent hydraulic binders, pozzolanic binders and mixtures thereof, and
   (iib) at least one alkaline activator selected from the group consisting of alkali metal hydroxides, alkali metal carbonates, alkali metal aluminates, alkali metal silicates, and mixtures thereof; and
(iii) water.

Furthermore, the present invention is directed to a geopolymer foam comprising at least one cationic copolymer (i) according to the present invention;
(ii) at least one inorganic binder mixture comprising
   (iia) at least one inorganic binder selected from the group consisting of latent hydraulic binders, pozzolanic binders and mixtures thereof, and
   (iib) at least one alkaline activator selected from the group consisting of alkali metal hydroxides, alkali metal carbonates, alkali metal aluminates, alkali metal silicates, and mixtures thereof; and
(iii) water.

For the purposes of the present invention, the expression "geopolymer foam formulation" is intended to mean that this formulation comprises all of the components required in order to provide a geopolymer foam, i.e. an inorganic binder, an alkaline activator, water, optionally surfactant(s) and a gas phase. Further optional components such as additives may by comprised. These components can take the form of premix, or else can be in separate form as what is known as a "kit of parts". The water and the alkaline activator can be provided separately from the other components, or the alkaline activator can be in dry form together with the other components, so that it is only then necessary to add water and to carry out foaming. It is, of course, also possible that the geopolymer foam formulation is in ready-foamed form.

The geopolymer foam or geopolymer foam formulation according to the present invention comprises at least one inorganic binder.

It is well known that inorganic binder systems can be based on reactive water-insoluble compounds based on $SiO_2$ in conjunction with $Al_2O_3$ which harden in an aqueous alkaline environment. Binder systems of this type are termed inter alia "geopolymers", and are described by way of example in U.S. Pat. No. 4,349,386, WO 85/03699 and U.S. Pat. No. 4,472,199. Materials that can be used as reactive oxide or reactive oxide mixture here are inter alia microsilica, metakaolin, aluminosilicates, flyash, activated clay, pozzolans or a mixture thereof. The alkaline environment used to activate the binders includes aqueous solutions of alkali metal carbonates, alkali metal fluorides, alkali metal hydroxides, alkali metal aluminates and/or alkali metal silicates, e.g. soluble waterglass. Geopolymers can be less costly and more robust than Portland cement and can have a more advantageous $CO_2$ emission balance. In relation to the term "foam" reference is made to the introduction to the description.

For the purposes of the present invention, a "latent hydraulic binder" is preferably a binder in which the molar ratio $(CaO+MgO):SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof, and the "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, natural and synthetic zeolites and mixtures thereof.

As used herein, the term "slag" refers to the by-product of a smelting process, or synthetic slag. The main use of a smelting process is to convert an ore, scrap or a material mixture containing different metals into a form from which the desired metals can be skimmed as a metal layer and the undesired metal oxides, e.g. silicates, alumina, etc., remain as the slag.

Blast furnace slag (BFS) is formed as a by-product during the smelting of iron ore in the blast-furnace. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2 kg^{-1}$) preferably from 300 to 500 $m^2 kg^{-1}$. Finer milling gives higher reactivity. For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Amorphous silica is preferably an X-ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Microsilica is a fine powder, mainly comprising amorphous $SiO_2$ powder and is a by-product of silicon or ferrosilicon production. The particles have a diameter of about 100 nm and a specific surface area of from about 15 to about 30 $m^2g^{-1}$.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m^2 g^{-1}$.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly, pure metakaolin comprises about 54% by weight of $SiO_2$ and about 46% by weight of $Al_2O_3$.

Aluminosilicates are minerals comprising aluminum, silicon, and oxygen, which may be ex-pressed by referring to the $SiO_2$ and $Al_2O_3$ content. They are a major component of kaolin and other clay minerals. Andalusite, kyanite, and sillimanite are naturally occurring alumino-silicate minerals that have the composition $Al_2SiO_5$.

Fly ash is produced inter alia during the combustion of coal in power stations, and comprises fine particles of varying composition. The main ingredients of fly ash are silicon oxide, aluminum oxide, and calcium oxide. Class C fly ash (brown-coal fly ash) comprises according to WO 08/012438 about 10 wt.-% CaO, whereas class F fly ash (hard-coal fly ash) comprises less than 8% by weight, preferably less than 4% by weight, and typically about 3% by weight of CaO.

Burnt shale, especially burnt oil shale is obtained at temperatures of about 800° C. by burning of natural shale and subsequent milling.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

An overview of suitable raw materials for geopolymers is found by way of example in Caijun Shi, Pavel V. Krivenko, Della Roy, Alkali-Activated Cements and Concretes, Taylor & Francis, London & New York, 2006, pp. 6-63.

Further suitable geopolymer foams, geopolymer foam formulations and processes for the production thereof are described in WO 2015/062860.

The term "particle size $(D_r)$" refers to the diameter of a particle distribution, wherein x % of the particles have a smaller diameter. The $D_{50}$ particle size is thus the median particle size. The $D_x$ particle size can e.g. be measured by laser diffraction or dynamic light scattering (DLS) methods.

According to the present invention dynamic light scattering (DLS) according to ISO 22412:2008 is preferably used. Dynamic light scattering (DLS), sometimes referred to as Quasi-Elastic Light Scattering (QELS), is a non-invasive, well-established technique for measuring the size and size distribution of molecules and particles typically in the submicron region. In the present invention the particles were characterized, which have been dispersed in a liquid, preferably water or ethanol. The Brownian motion of particles or molecules in suspension causes laser light to be scattered at different intensities. Analysis of these intensity fluctuations yields the velocity of the Brownian motion and hence the particle size using the Stokes-Einstein relationship. The distribution can be a volume distribution ($D_v$), a surface distribution ($D_s$), or a number distribution ($D_n$). In context of this application, the $D_x$ value refers to a number distribution, wherein x(number) % of the particles have a smaller diameter.

In a preferred embodiment, the at least one inorganic binder is selected from the group consisting of blast furnace slag, microsilica, metakaolin, aluminosilicates, fly ash, and mixtures thereof. In a particularly preferred embodiment, the at least one inorganic binder is selected from metakaolin, fly ash and mixtures thereof.

The alkaline activator mentioned above is required to establish an alkaline environment for activating the inorganic binder, i.e. the geopolymer binder, so that the latent hydraulic binder will become hydraulic. The alkaline activator can be selected from the group consisting of alkali metal hydroxides, alkali metal carbonates, alkali metal aluminates, alkali metal silicates and mixtures thereof.

It is preferable to select an alkaline activator from alkali metal hydroxides of the formula MOH and alkali metal silicates of the formula m $SiO_2 \times n$ $M_2O$, where M is the alkali metal, preferably Li, Na or K or a mixture thereof, and the molar ratio m:n is ≤4.0, preferably ≤3.0, with further preference ≤2.0, in particular ≤1.70.

The alkali metal silicate is preferably water glass, particularly preferably an aqueous water glass and in particular a sodium water glass or potassium water glass. However, it is also possible to use lithium water glass or ammonium water glass or a mixture of the water glasses mentioned. The m:n ratio stated above (also termed "modulus") should preferably not be exceeded, since otherwise reaction of the components is likely to be incomplete. It is also possible to use very much smaller moduli, for example about 0.2. Water glasses with higher moduli should be adjusted before use to moduli in the range of the invention by using a suitable aqueous alkali metal hydroxide.

In a preferred embodiment, the at least one alkaline activator is water glass.

The term "water glass" refers to alkali metal silicates, which are water soluble. Water glass can be obtained by the reaction of alkali metal carbonates with quartz sand (silicon dioxide). However, they can also be produced from mixtures of reactive silicas with the appropriate aqueous alkali metal hydroxides. Non-limiting examples of water glass comprise $Na_2SiO_3$, $K_2SiO_3$, and $Li_2SiO_3$. In addition to the anhydrous form, various hydrates of water glass exist as well. Typical trace impurities are based on the elements Al, Ca, Cr, Cu, Fe, Mg, and Ti. The ratio of alkali metal to silicate can vary. This ratio is defined in terms of the molar ratio of m $SiO_2$ to n $M_2O$ as mentioned above. Typical values for the ratio m:n are values smaller than 4, smaller than 3, smaller than 2, or in the vicinity of 1.7.

Potassium water glasses in the advantageous modulus range are mainly marketed as aqueous solutions because they are very hygroscopic; sodium water glasses in the advantageous modulus range are also obtainable commercially as solids. The solids contents of the aqueous water glass solutions are generally from 20% by weight to 60% by weight, preferably from 40 to 60% by weight.

The preferred quantity of the alkaline activator is from 1 to 55 wt.-% and in particular from 10 to 50 wt.-%.

In a preferred embodiment, the at least one inorganic binder mixture (ii) further comprises at least one additional inorganic binder, preferably cement and/or calcium sulfate. In a particularly preferred embodiment, the at least one inorganic binder mixture comprises at least one additional inorganic binder selected from portland cement, calcium aluminate cement, calciumsulfoaluminate cement, calciumsulfate and mixtures thereof. The amount of the additional inorganic binder, if present, has to be less than 30 wt.-%, preferably less than 25 wt.-%, more preferably less than 10 wt.-%, based on the inorganic binder (iia).

Cement is an inorganic, finely milled hydraulic binder. The different types of cement are classified according to DIN EN 197-1 (11/2011) into the categories CEM I-V. These different cements vary from each other in their stability towards various corrosives and these cements therefore have different applications.

CEM I cement, also called Portland cement, contains about 70 wt.-% CaO and MgO, about 20 wt.-% $SiO_2$, about 10 wt.-% $Al_2O_3$ and $Fe_2O_3$. This cement is obtained by milling and baking limestone, chalk and clay. CEM II cement is Portland cement with a low (about 6 to about 20 wt.-%) or moderate (about 20 to about 35 wt.-%) amount of additional components. This cement may further contain blast-furnace slag, fumed silica (10 wt.-% at most), natural pozzolans, natural calcined pozzolans, fly ash, burnt shale, or mixtures thereof. CEM III cement, also called blast-furnace cement, is comprised of Portland cement hat contains 36 to 85 wt.-% of slag. CEM IV cement, also called pozzolanic cement, contains next to Portland cement 11 to 65% of mixtures of pozzolans, silica fume and fly ash. CEM V cement, also called composite cement, contains next to Portland cement 18 to 50 wt.-% of slag, or mixtures of natural pozzolans, calcined pozzolans, and fly ash. Additionally, the different types of cements may contain 5 wt.-% of additional inorganic, finely milled mineral compounds.

The term "calcium aluminate cements" refers to cements that predominantly comprise $CaO \times Al_2O_3$. They can, e.g., be obtained by melting calcium oxide (CaO) or limestone ($CaCO_3$) and bauxite or aluminate together. Calcium aluminate cement comprises about 20 to 40% by weight of CaO, up to about 5% by weight of $SiO_2$, about 35 to 80% by weight of $Al_2O_3$ and up to about 20% by weight of $Fe_2O_3$. Calcium aluminate cements are defined according to DIN EN 14647 (01/2006).

The term "calcium sulfoaluminate cement" refers to a cement which contains ye'elimite as well as calcium sulfate. Calcium sulfate may be provided as calcium sulfate dihydrate ($CaSO_4 \times 2H_2O$), calcium sulfate hemihydrate ($CaSO_4 \times 1/2$ $H_2O$) and anhydrite ($CaSO_4$). Natural occurring gypsum is $CaSO_4 \times 2H_2O$. However, burnt gypsum can be in a variety of hydration states according to the generic formula $CaSO_4 \times nH_2O$, with 0 n<2.

Furthermore, various additives may be used according to the present invention. In a preferred embodiment, the at least one additive is selected from the group consisting of pH modifiers, fillers, accelerators, retarders, further rheology modifiers, superplasticizers, fibers, pigments and anionic, further cationic and/or non-ionic surfactants, catalysts, and mixtures thereof.

The geopolymer foam formulation or the geopolymer foam optionally further comprises at least one additive. Preferable additives are selected from the group consisting of fillers, accelerators, retarders, rheology modifiers, superplasticizers, fibers, and surfactants.

In that regard, pickering foams are equivalent and have the same effect. Pickering foams are characterized by a cellular structure of close-celled polymer foams.

The geopolymer foam formulation or the geopolymer foam optionally further comprises at least one additive, which is a surfactant. Preferably, the surfactant is a non-ionic surfactant and more preferably an alkylpolyglycoside surfactant.

The geopolymer foam formulation or the geopolymer foam optionally further comprises at least one additive, which is a further rheology modifier. The further rheology modifier is preferably a polymer dispersion, more preferably a polymer dispersion comprising at least one copolymer comprising structural units formed from vinyl acetate and structural units formed from at least one further ethylenically unsaturated monomer. The further rheology modifier does preferably not contain cationic structures.

Rheology modifiers adjust the viscosity and thus the flow behavior and ensure a good balance between consistency, durability and application properties. These modifiers can be based on synthetic polymers (e.g. acrylic polymers), cellulose, silica, starches or clays.

Superplasticizers are polymers that function as dispersant to avoid particle segregation and improve the rheology and thus workability of suspensions. Superplasticizers generally can be divided into four categories: lignosulfonates, melamine sulfonates, naphthalene sulfonates, and comb polymers (e.g. polycarboxylate ethers, polyaromatic ethers and mixtures thereof).

The setting time of the geopolymer foam can be prolonged/shortened by the addition of certain compounds called retarders/accelerators. Retarders can be divided into the groups of lignosulfonates, cellulose derivatives, hydroxyl carboxylic acids, organophosphates, synthetic retarders, and inorganic compounds. Non-limiting examples of retarders are hydroxyethyl cellulose, carboxymethyl hydroxyethyl cellulose, citric acid, tartaric acid, gluconic acid, glucoheptonate, maleic anhydride, 2-Acrylamido-2-methylpropanesulfonic acid (AMPS) copolymers, borax, boric acid, and ZnO. Non-limiting examples of accelerators are $CaCl_2$, KCl, $Na_2SiO_3$, NaOH, $Ca(OH)_2$, and CaO x $Al_2O_3$, lithium silicate, potassium silicate, and aluminum salts, such as aluminum sulfate.

Fibers (or stabilizing fibers) can be added during the foaming process to further increase the stability of the foam. Such fiber can be made of a variety of materials, such as rock (e.g. basalt), glass, carbon, organic polymers (e.g. polyethylene, polypropylene, polyacrylonitrile, polyamides, and polyvinyl alcohols), cellulose, lignocellulose, metals (e.g. iron or steel), and mixtures thereof. Organic fibers are preferred. The amount of the fibers can be up to 3 wt.-%, preferably from 0.1 to 2 wt.-%, more preferably 0.1 to 1.5 wt.-%, even more preferably 0.1 to 1 wt.-% and in particular 0.2 to 0.7 wt.-%, based on the at least one inorganic binder mixture. The fibers preferably have a length of up to 200 mm or up to 120 mm, preferably up to 100 mm, more preferably up to 50 mm, most preferably up to 25 mm and in particular up to 20 mm, and a diameter of up to 100 µm.

The term "filler" refers primarily to materials that can be added to increase the volume without impairing the properties of the foam. The fillers mentioned can be selected from the group consisting of quartz sand or powdered quartz, calcium carbonate, rock flour, low-density fillers (for example vermiculite, perlite, diatomaceous earth, mica, talc powder, magnesium oxide, foamed glass, hollow spheres, foam sand, clay, polymer particles), pigments (e.g. titanium dioxide), high density fillers (e.g. barium sulphate), metal salts (e.g. zinc salts, calcium salts, etc.), and mixtures thereof. Grain sizes suitable here are in particular up to 500 µm. It is particularly preferable that the average grain size is up to 300 µm, preferably up to 150 µm.

Surfactants, which may be used in addition to the amphiphilic compound as defined herein, include non-ionic surfactants, anionic surfactants, cationic surfactants, zwitterionic surfactants and proteins or synthetic polymers mixtures thereof.

Non-ionic surfactants include fatty alcohols, cetyl alcohol, stearyl alcohol, and cetostearyl alcohol (comprising predominantly cetyl and stearyl alcohols), and oleyl alcohol. Further examples include polyethylene glycol alkyl ethers (Brij) $CH_3-(CH_2)_{10-16}-(O-C_2H_4)_{1-25}-OH$ such as octaethylene glycol monododecyl ether or pentaethylene glycol monododecyl ether; polypropylene glycol alkyl ethers $CH_3-(CH_2)_{10-16}-(O-C_3H_6)_{1-25}-OH$; glucoside alkyl ethers $CH_3-(CH_2)_{10-16}$ (O-Glucoside)$_{1-3}$-OH such as decyl glucoside, lauryl glucoside, octyl glucoside; polyethylene glycol octylphenyl ethers $C_8H_{17}-(C_6H_4)-(O-C_2H_4)_{1-25}-OH$ such as Triton X-100; polyethylene glycol alkylphenyl ethers $C_9H_{19}-(C_6H_4)-(O-C_2H_4)_{1-25}-OH$ such as nonoxynol-9; glycerol alkyl esters such as glyceryllaurate; polyoxyethylene glycol sorbitan alkyl esters such as polysorbate; sorbitan alkyl esters such as spans; cocamide MEA, cocamide DEA; dodecyldimethylamine oxide; block copolymers of polyethylene glycol and polypropylene glycol such as poloxamers; polyethoxylated tallow amine (POEA). Preferred non-ionic surfactants also include alkyl polyglucosides. Alkyl polyglucosides generally have the formula $H-(C_6H_{10}O_5)_m-O-R^1$, where $(C_6H_{10}O_5)$ is a glucose unit and $R^1$ is a $C_6$-$C_{22}$-alkyl group, preferably a $C_8$-$C_{16}$-alkyl group and in particular a $C_8$-$C_{12}$-alkyl group, and m=from 1 to 5.

Anionic surfactants contain anionic functional groups at their head, such as sulfate, sulfonate, phosphate, and carboxylates. Prominent alkyl sulfates include ammonium lauryl sulfate, sodium lauryl sulfate (sodium dodecyl sulfate, SLS, or SDS), and the related alkyl-ether sulfates sodium laureth sulfate (sodium lauryl ether sulfate or SLES), and sodium myreth sulfate. Others include docusate (dioctyl sodium sulfosuccinate), perfluorooctanesulfonate (PFOS), perfluorobutanesulfonate, alkyl-aryl ether phosphates, alkyl ether phosphates. Preferred carboxylates include the alkyl carboxylates, such as sodium stearate. More specialized species include sodium lauryl sarcosinate and carboxylate-based fluoro-surfactants such as perfluorononanoate, perfluorooctanoate (PFOA or Pro).

Cationic surfactants include, dependent on the pH, primary, secondary, or tertiary amines: Primary and secondary amines become positively charged at pH<10. An example is octenidine dihydrochloride. Furthermore, cationic surfactants include permanently charged quaternary ammonium salts, such as cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB).

Zwitterionic (amphoteric) surfactants have both cationic and anionic centers attached to the same molecule. The cationic part is based on primary, secondary, or tertiary amines or quaternary ammonium cations. The anionic part can be more variable and include sulfonates, as in the sultaines CHAPS (3-[(3-Cholamidopropyl)dimethylammonio]-1-propane-sulfonate) and cocamidopropyl hydroxysultaine. Betaines such as cocamidopropyl betaine have a carboxylate with the ammonium. The most common biological zwitterionic surfactants have a phosphate anion with an amine or ammonium, such as the phospholipids phosphatidylserine, phosphatidylethanolamine, phosphatidylcholine, and sphingomyelins. Non-limiting examples of proteins are bovine serum albumin, egg ovalbumin, milk caseins or beta-lactoglobulin.

The proportion of the surfactant can vary over a broad range. The surfactant may be present in an amount of up to 2.5 wt.-%, preferably up to 1.5 wt.-% based on the total weight of the geopolymer foam formulation. The total weight of the geopolymer foam formulation is preferably the sum of the binder(s), activator, water, optionally surfactant and optionally further formulation components like for example fillers, fibers, superplasticizers, further rheology modifiers, catalysts and so on.

Catalysts that may be used as additives are catalysts that may be used in combination with a chemical foaming agent. Suitable catalysts are mentioned above and below in the context of blowing agents.

Further details regarding the amounts of the components as used according to the present invention are defined hereinafter.

The cationic copolymer is comprised in the geopolymer foam formulation in the range from 0.01% to 20.0%, preferably from 0.1% to 10.0%, more preferably from 0.2% to 5.0% and most preferably from 0.3 to 2%, by weight, based on the total weight of the geopolymer foam formulation. The total weight of the geopolymer foam formulation is preferably the sum of the binder(s), activator, water, optionally surfactant and optionally further formulation components like for example fillers, fibers, superplasticizers, further rheology modifiers, catalysts and so on.

Suitable amounts of the additives may vary over a broad range and also depend on the type of additive. Typically, the at least one additive is provided in weight percent amount of from 0.0003 to 30 wt.-%, or of from 0.03 to 25 wt.-%, based on the total weight of the geopolymer foam formulation. However, fillers may also be used in higher amounts. In particular, the filler may be present in similar amounts as the inorganic binder. Preferably, the weight ratio of filler to at least one inorganic binder mixture may be from 2:1 to 1:100, preferably from 1:1 to 1:10.

Furthermore, the present invention is directed to a process for preparing a geopolymer foam comprising
(1) preparing a geopolymer foam formulation according to the present invention by mixing the at least one cationic copolymer (i) with
 (ii) the at least one inorganic binder mixture comprising
  (iia) at least one inorganic binder selected from the group consisting of latent hydraulic binders, pozzolanic binders and mixtures thereof, and
  (iib) at least one alkaline activator selected from the group consisting of alkali metal hydroxides, alkali metal carbonates, alkali metal aluminates, alkali metal silicates, and mixtures thereof;
 (iii) water; and
 (iv) optionally at least one additive, preferably a surfactant, more preferably a non-ionic surfactant and most preferably an alkyl polyglucoside; and
(2) foaming of the resulting geopolymer foam formulation by chemical, physical and/or mechanical foaming.

The present invention is further directed to a geopolymer foam obtained by the above mentioned process for preparing a geopolymer foam.

The present invention is further directed to a cellular material which is obtained by hardening and optionally drying the geopolymer foam obtained by the above mentioned process for preparing a geopolymer foam.

The present invention is further directed to a composition for preparing a geopolymer foam formulation comprising as components at least one cationic copolymer (i) according to the present invention; and
(ii) at least one inorganic binder mixture comprising
 (iia) at least one inorganic binder selected from the group consisting of latent hydraulic binders, pozzolanic binders and mixtures thereof, and
 (iib) at least one alkaline activator selected from the group consisting of alkali metal hydroxides, alkali metal carbonates, alkali metal aluminates, alkali metal silicates, and mixtures thereof;
wherein
the components are present separately; or
the components are present in a mixture.

The composition for preparing a geopolymer foam formulation optionally further comprises at least one additive. Preferable additives are selected from the group consisting of fillers, accelerators, retarders, rheology modifiers, superplasticizers, fibers, and surfactants.

The composition for preparing a geopolymer foam formulation optionally further comprises at least one additive, which is a surfactant. Preferably, the surfactant is a non-ionic surfactant and more preferably an alkylpolyglycoside surfactant.

The composition for preparing a geopolymer foam formulation optionally further comprises at least one additive, which is a further rheology modifier. The further rheology modifier is preferably a polymer dispersion, more preferably a polymer dispersion comprising at least one copolymer comprising structural units formed from vinyl acetate and structural units formed from at least one further ethylenically unsaturated monomer.

The present invention is further illustrated by the following examples

CATIONIC POLYMER EXAMPLES

P-1:
A cationic comb polymer composed of MPEG475-MA: 1-Vinyl-3-methylimidazolium methyl sulfate in a molar ratio of 1:6, Mw=4.0 kDa, Mn=1.7 kDa:
MPEG475-MA=methyl poly ethylene glycol (MPEG) ester of methacrylic acid having an Mn of 475 g/mol P-2:
A cationic copolymer having no side-chains and being composed of 1-Vinyl-3-methylimidazolium chloride: N-vinylpyrrolidone in a mass ratio of 95:5, molar weight 40 kDa.

P-3:
A cationic copolymer having no side-chains and being composed of 1-Vinyl-3-methylimidazolium chloride: N-vinylpyrrolidone in a mass ratio of 50:50, molar weight 80 kDa.

Application Examples

Two sets of experiments with different binder systems were done, each set of experiments is related to the base formulations according to the tables 1 and 2. The following tables contain the components of each formulation (accelerator, (water), surfactant and inorganic binder(s) like for example metakaolin or fly ash).

TABLE 1

(metakaolin/fly ash based formulation):

| Component | Mass [g] |
|---|---|
| Water Glass 58 KWGL (BASF) | 27.01 |
| NaOH | 1.534 |
| Water | 13.81 (in examples 1a-4 and 1b only 12.43 g) |
| Surfactant Alkylpolyglucoside: Glucopon 225DK (BASF) | 0.46 |
| Metakaolin: Argical 1200 S | 15.34 |
| Fly ash: Flugasche Steament L10 | 14.43 |

TABLE 2

(metakaolin based formulation):

| Component | Mass [g] |
|---|---|
| K4 potassium water glass (Woellner) | 216 |
| NaOH | 12.4 |
| Water | 111.6 |
| Surfactant Alkylpolyglucoside: Glucopon 225DK (BASF) | 8 |
| Metakaolin: Metamax (BASF) | 124 |
| Dispersion: Vinnapas 5044 | 24.5 |

General Procedures
Preparation of Unfoamed Suspensions

In a first step, by mixing of the components of each of the before standing tables (without the surfactant, but with or without the cationic polymers of examples P-1- to P-3), respective unfoamed suspensions were obtained. The density of the obtained unfoamed suspensions is summarized in each case in table 3.

Preparation of the Fresh Mineral Foams

In the second step, the surfactant Glucopon 225DK was added to the unfoamed suspensions obtained in the first step and the mixture was mixed for further 30 seconds. The suspensions were pumped by way of a hose into a fully automatic foaming machine for continuous foaming of liquids and low-viscosity pastes, operating in accordance with the stator-rotor principle (Magromix+from Heitec Auerbach GmbH). The process parameters were as follows: mixing head rotation rate 300 rpm, system air pressure approx. 2 bar, material throughput 120 liters/hour.

The air content of the obtained foamed suspensions was determined here by way of the volume change in comparison with the unfoamed suspension by a method based on DIN EN 1015-6. The densities of the foamed samples in the wet state are summarized in table 3.

A number of examples were prepared with the same base formulations as mentioned in table 1 and 2 with the same two-step procedure ($1^{st}$ step preparation of unfoamed suspension and $2^{nd}$ step preparation of the foam) as explained in the before standing text, with or without the cationic polymers. Details are given in table 3.

Hardening of the Mineral Foams

For curing samples were stored at room temperature and 50% humidity for a period of one day.

Test Methods:

As an introduction, in the following chapter the testing methods and their technical meaning are briefly explained. The evaluation was done during or after the before mentioned three steps of producing the unfoamed suspension, the fresh mineral foams and the hardening of the mineral foams, in most of the cases by relatively simple visual test methods.

As a general remark, it is on the one side desired to obtain a good workability and foamability of the suspensions during the foaming process. During the foaming process mechanical energy is introduced into the system by the mixing process. On the one side a relatively low viscosity of the suspension is desirable in order to allow a smooth and effective foaming process. On the other side after the foaming process is finished (after mixing is finished), it is desired that the foamed samples stay stable and do not collapse until the setting (hardening) of the inorganic binder system takes place.

The relatively low viscosity of the system during the mixing, followed by a relatively high viscosity when the foamed samples are no more mixed, is a typical thixotropic behavior. The thixotropic effect is highly desirable, because it allows on the one side a smooth and readily workable foaming process and on the other side the thixotropic effect helps considerably to keep the fresh foamed sample enough stable (no collapsing of the fresh foams) until the hardening of the inorganic binder system takes place. In the following text each test method is explained in detail.

Workability Test (Foamability Test by Observation During Mixing Process)

In this test the workability of the foams is evaluated during the mixing of the unfoamed suspensions with the surfactant in order to obtain the foamed suspensions. Basically, the time for obtaining the desired density of the fresh foamed suspensions is measured. In all of the examples the test conditions were chosen in a way that the time for obtaining the desired target density of the fresh foamed suspensions is in a reasonable range (about 5 minutes). It is supposed that the viscosity of the suspensions is important for the workability, it should not be too high in order to ensure a smooth foaming process.

Stability Test (ST) (Beaker Method)

A stability test for the fresh foam samples was established as follows: a 250 mL beaker is filled with foam and tilt at an angle of 90°. The optimum result is observed if no liquid foam flows out of the beaker before setting, a slow and partial flowing out is a considerable improvement in comparison to a rather fast flowing. The stability test, especially in combination with the before mentioned workability test, is a test for thixotropy. It is desirable that the slurry viscosity during mixing is rather low, but shortly after stopping mixing the foams should be not flowable or only be little flowable in order to guarantee stability for the foams until hardening sets on.

Dripping Test (DT) (Spatula Method)

The dripping test is a similar test as the stability test (beaker method). It is also a method to evaluate the thixotropy of the foams. The dripping test is done by introducing a spatula into the freshly prepared foam and taking it out of the foam. In the ideal case the foam is so viscous that the foam adheres to the spatula and does not drip off from the spatula.

Visual Observation Test (VOT) for Cracking (Shrinkage)

The obtained samples were evaluated for cracks by visual observation after hardening. The curing conditions were storing of the samples at room temperature and 50% humidity for a period of one day. It is believed that mainly shrinkage is the reason for the crack formation.

Test Results

An overview of all the experiments and the results is given in the following table 3. As mentioned before, the workability (foamability) of all examples was chosen to be in a reasonably well workable range.

In some cases the insulation properties of the hardened foams were determined by measuring the lambda value (mW/m*K), this is a further indicator for homogeneity of hardened foams on macro- and microstructure level.

The experiments and results of table 3 show that in comparison to the examples with no addition of cationic polymers a considerable improvement of the stability of the foams (results of the stability test and the dripping test) could be achieved. The workability of the samples during mixing (foaming) was in a satisfactory range and a good thixotropic effect could be observed after stopping mixing. The samples proved to have a good foam stability.

It was also possible to reduce the amount of water (example 1a-4 and 1b) by 10 weight % without negative influence on the thixotropic effect and the workability. At the same time the cracking was in an acceptable range.

Also in the visual observation test (cracking) much better results could be obtained for the samples according to the invention, compared to the comparative examples. The number of cracks was considerably reduced as the table shows.

The invention claimed is:

1. A method of utilizing at least one cationic copolymer (i) as a rheology modifier in a geopolymer foam formulation, the method comprising:
   mixing the at least one cationic copolymer (i) with components of the geopolymer foam formulation during the preparation thereof,
   wherein the at least one cationic copolymer (i) comprises
   a) 3 to 97 mol-% of a cationic structural unit of formula (I)

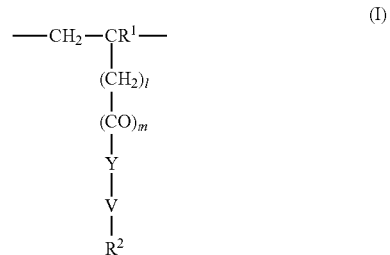

wherein
   $R^1$ in each occurrence is the same or different and represents hydrogen and/or methyl,

TABLE 3 overview of the experiments and the test results

| | Base formulation Table # | Polymer (dosage in wt %) [1] | Lambda value (mW/m*K) | Stability Test [2] | Dripping Test [3] | Visual observation test (VOT) (cracking) [4] | Density of unfoamed suspensions [g/l] | Density of wet foamed suspensions [g/l] | Annotations |
|---|---|---|---|---|---|---|---|---|---|
| Example 1 (blank, comp.) | Table 1 | — | — | 3 | 3 | 3 | 1700 | 376 | — |
| Example 1a-1 | Table 1 | P-2 (0.3) | — | 2 | 2 | 2 | 1772 | 377 | — |
| Example 1a-2 | Table 1 | P-2 (0.7) | — | 2 | 2 | 2 | 1758 | 397 | — |
| Example 1a-3 | Table 1 | P-2 (1.5) | — | 2 | 2 | 1 | 1735 | 387 | — |
| Example 1a-4 | Table 1 [5] (reduced H$_2$O by 10%) | P-2 (0.7) | — | 2 | 2 | 2 | 1759 | 361 | Reduced water by 10% |
| Example 1b | Table 1 [5] (reduced H$_2$O by 10%) | P-1 (1.0) | — | 2 | 2 | 2 | 1723 | 441 | Reduced water by 10% |
| Example 2 (blank, comp.) | Table 2 | — | 46 | 3 | 3 | 3 | 1406 | 217 | Very instable crumbly foam, |
| Example 2a | Table 2 | P-2 (1.2) | 42 | 2 | 2 | 1 | 1415 | 215 | Considerable improvement of the surface feel |
| Example 2b | Table 2 | P-3 (1.2) | 42 | — | — | — | — | — | — |

[1] The dosage indications in wt.-% refer to the weight of the cationic polymer (dry polymer) on the weight of the components in tables 1 or 2 (water glass, NaOH, water, surfactant and respective inorganic binder(s)).

[2] The number 1 means an excellent result with few or no foam flowing out, 2 means a good result with a medium amount of foam flowing out and 3 means an unsatisfactory result with major amount of foam flowing relatively quickly out of the test beaker.

[3] Similar as in the stability test, the number 1 means an excellent result with all of the foam sticking to the spatula or nearly all of it, 2 means a medium result with some of the foam dripping from the spatula and 3 is an unsatisfactory result with major amount of foam dripping down from the spatula.

[4] The number 1 means a good results with no cracks being observable or only very few and minor cracks, number 2 means still a good result with a still acceptable cracking and 3 is an unsatisfactory result with heavy cracking.

[5] The amount of water was reduced by 10 wt %, which means that in the case of the Example 1a-4 and Example 1b instead of 13.81 g only 12.43 g of water were used.

$R^2$ in each occurrence is the same or different and is selected from the group consisting of

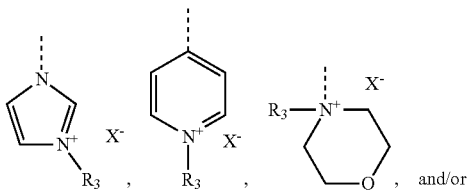
, and/or

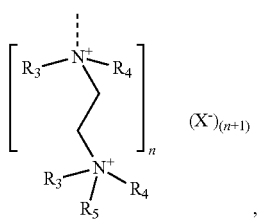
, wherein
$R^3$, $R^4$, and $R^5$ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety, X in each occurrence is the same or different and represents a halogen atom, a $C_1$-$C_4$-alkyl sulfate, a $C_1$-$C_4$-alkyl sulfonate, a $C_6$-$C_{14}$-(alkyl) aryl sulfonate and/or a monovalent equivalent of a polyvalent anion, which is selected from a sulfate, a disulfate, a diphosphate, a triphosphate, and/or a polyphosphate, and n in each occurrence is the same or different and represents an integer from 0 to 10, l in each occurrence is the same or different and represents an integer from 0 to 2, m in each occurrence is the same or different and represents 0 or 1, Y in each occurrence is the same or different and represents an absent group, oxygen, NH, and/or $NR^3$, and V in each occurrence is the same or different and represents $-(CH_2)_x-$,

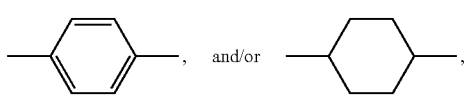
, and/or
, wherein
x in each occurrence is the same or different and represents an integer from 1 to 6 b) 97 to 3 mol-% of a macromonomeric structural unit of formula (II)

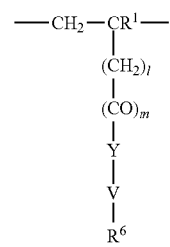
(II)

wherein
$R^1$, l, m, Y, and V have the meanings given above,
$R^6$ in each occurrence is the same or different and represents a polyoxyalkylene group of the following formula (IIa)

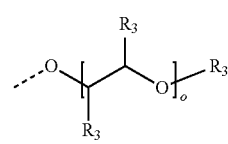
(IIa)

wherein
o in each occurrence is the same or different and represents an integer from 1 to 300, and
$R^3$ has the meaning given above.

2. A method of utilizing at least one cationic copolymer (i) as a rheology modifier in a geopolymer foam formulation, the method comprising:
mixing the at least one cationic copolymer (i) with components of the geopolymer foam formulation during the preparation thereof,
wherein the at least one cationic copolymer (i) comprises
a) 3 to 97 mol-% of a cationic structural unit of formula (I)

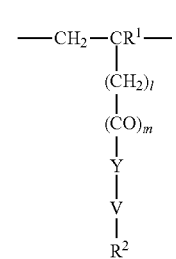
(I)

wherein
$R^1$ in each occurrence is the same or different and represents hydrogen and/or methyl,
$R^2$ in each occurrence is the same or different and is selected from the group consisting of

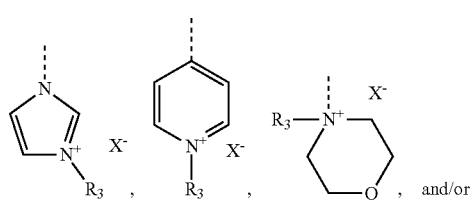
, and/or

-continued

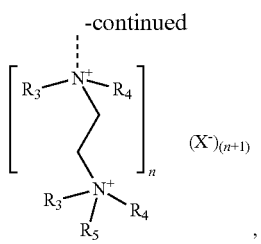

wherein
$R^3$, $R^4$, and $R^5$ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety, X in each occurrence is the same or different and represents a halogen atom, a $C_1$-$C_4$-alkyl sulfate, a $C_1$-$C_4$-alkyl sulfonate, a $C_6$-$C_{14}$-(alkyl) aryl sulfonate and/or a monovalent equivalent of a polyvalent anion, which is selected from a sulfate, a disulfate, a diphosphate, a triphosphate, and/or a polyphosphate, and n in each occurrence is the same or different and represents an integer from 0 to 10, l in each occurrence is the same or different and represents an integer from 0 to 2, m in each occurrence is the same or different and represents 0 or 1, Y in each occurrence is the same or different and represents an absent group, oxygen, NH, and/or $NR^3$, and V in each occurrence is the same or different and represents —$(CH_2)_x$—,

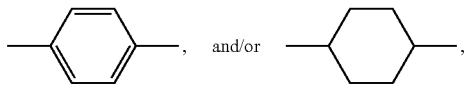

wherein
x in each occurrence is the same or different and represents an integer from 0 to 6;
and optionally
b) 97 to 3 mol-% of a macromonomeric structural unit of formula (II)

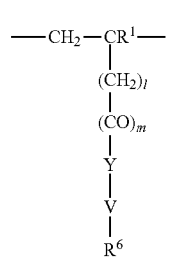

wherein
$R^1$ has the meaning given above,
$R^6$ in each occurrence is pyrrolidone and/or caprolactam, and
l, m, Y and V are 0 or absent groups.

3. A method of utilizing at least one cationic copolymer (i) as a rheology modifier in a geopolymer foam formulation, the method comprising:
mixing the at least one cationic copolymer (i) with components of the geopolymer foam formulation during the preparation thereof,
wherein the at least one cationic copolymer (i) comprises
10 to 90 mol.-% of at least one cationic structural unit (I) comprising at least one cationic group, and
90 to 10 mol.-% of at least one macromonomeric structural unit (II) comprising at least one polyoxyalkylene group.

4. A geopolymer foam formulation comprising
(i) at least one cationic copolymer (i) comprising
a) 3 to 97 mol-% of a cationic structural unit of formula (I)

$$—CH_2—CR^1— \atop \begin{array}{c} (CH_2)_l \\ (CO)_m \\ Y \\ V \\ R^2 \end{array}$$ (I)

wherein
$R^1$ in each occurrence is the same or different and represents hydrogen and/or methyl,
$R^2$ in each occurrence is the same or different and is selected from the group consisting of

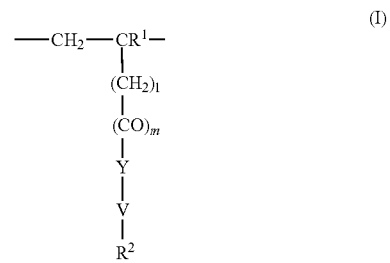

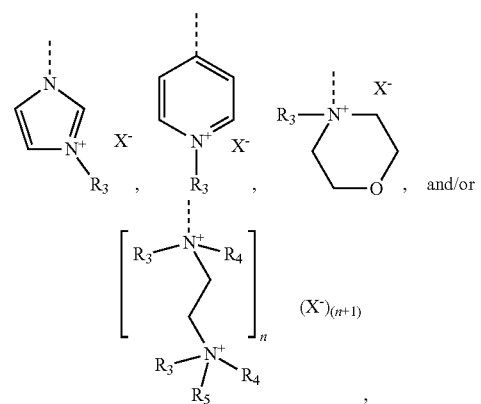

wherein
$R^3$, $R^4$, and $R^5$ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety, X in each occurrence is the same or different and represents a halogen atom, a $C_1$-$C_4$-alkyl sulfate, a $C_1$-$C_4$-alkyl sulfonate, a $C_6$-$C_{14}$-(alkyl) aryl sulfonate and/or a monovalent equivalent of a polyvalent anion, which is selected from a sulfate, a disulfate, a diphosphate, a triphosphate, and/or a polyphosphate, and n in each occurrence is the same or different and represents an integer from 0 to 10, l in each occurrence is the same or different and represents an integer from 0 to 2, m in each occurrence is the same or different and represents 0 or 1, Y in each occurrence is the same or different and represents an absent group, oxygen, NH, and/or $NR^3$, and V in each occurrence is the same or different and represents —$(CH_2)_x$—,

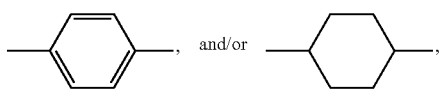

wherein x in each occurrence is the same or different and represents an integer from 1 to 6; and optionally b) 97 to 3 mol-% of a macromonomeric structural unit of formula (II)

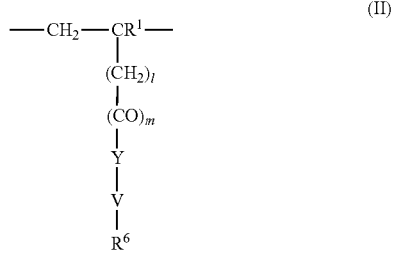

wherein $R^1$, l, m, Y, and V have the meanings given above, $R^6$ in each occurrence is the same or different and represents a polyoxyalkylene group of the following formula (IIa)

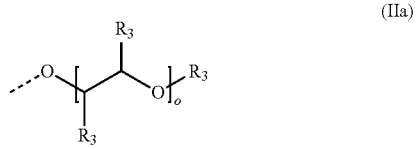

wherein in each occurrence is the same or different and represents an integer from 1 to 300, and $R^3$ has the meaning given above;

(ii) at least one inorganic binder mixture comprising (iia) at least one inorganic binder selected from the group consisting of latent hydraulic binders, pozzolanic binders and mixtures thereof, and (iib) at least one alkaline activator selected from the group consisting of alkali metal hydroxides, alkali metal carbonates, alkali metal aluminates, alkali metal silicates, and mixtures thereof; and (iii) water.

5. The geopolymer foam formulation according to claim 4, wherein the geopolymer foam formulation further comprises at least one additive selected from the group consisting of fillers, accelerators, retarders, further rheology modifiers, superplasticizers, fibers, pigments and anionic, further cationic and/or non-ionic surfactants.

6. The geopolymer foam formulation according to claim 4, wherein the geopolymer foam formulation further comprises at least one additive, which is a surfactant.

7. The geopolymer foam formulation according to claim 4, wherein the geopolymer foam formulation further comprises at least one additive, which is a further rheology modifier.

8. The geopolymer foam formulation according to claim 6, wherein the geopolymer foam formulation further comprises at least one additive, which is a non-ionic surfactant.

9. The geopolymer foam formulation according to claim 6, wherein the geopolymer foam formulation further comprises at least one additive, which is an alkylpolyglucoside surfactant.

10. The geopolymer foam formulation according to claim 7, wherein the geopolymer foam formulation further comprises at least one additive, which is a further rheology modifier comprising a polymer dispersion formed from ethylenically unsaturated monomers.

11. A process for preparing a geopolymer foam comprising (1) preparing a geopolymer foam formulation as defined in claim 7 by mixing the at least one cationic copolymer (i) with (ii) the at least one inorganic binder mixture comprising (iia) at least one inorganic binder selected from the group consisting of latent hydraulic binders, pozzolanic binders and mixtures thereof, and (iib) at least one alkaline activator selected from the group consisting of alkali metal hydroxides, alkali metal carbonates, alkali metal aluminates, alkali metal silicates, and mixtures thereof;

(iii) water; and (iv) optionally at least one additive; and (2) foaming of the resulting geopolymer foam formulation by chemical, physical and/or mechanical foaming.

12. A geopolymer foam obtained by the process according to claim 11.

13. A composition for preparing a geopolymer foam formulation comprising as components (i) at least one cationic copolymer (i) comprising a) 3 to 97 mol-% of a cationic structural unit of formula (I)

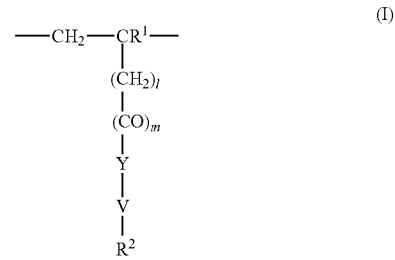

wherein $R^1$ in each occurrence is the same or different and represents hydrogen and/or methyl $R^2$ in each occurrence is the same or different and is selected from the group consisting of

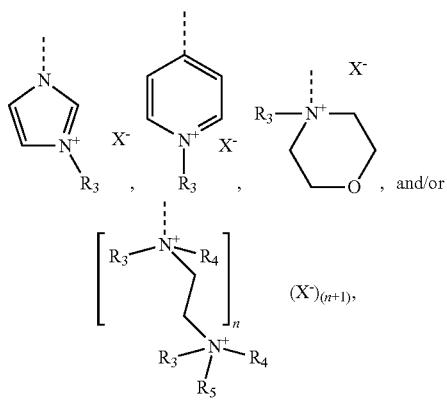

wherein
R$^3$, R$^4$, and R$^5$ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety, X in each occurrence is the same or different and represents a halogen atom, a C$_1$-C$_4$-alkyl sulfate, a C$_1$-C$_4$-alkyl sulfonate, a C$_6$-C$_{14}$-(alkyl) aryl sulfonate and/or a monovalent equivalent of a polyvalent anion, which is selected from a sulfate, a disulfate, a diphosphate, a triphosphate, and/or a polyphosphate, and n in each occurrence is the same or different and represents an integer from 0 to 10, l in each occurrence is the same or different and represents an integer from 0 to 2, m in each occurrence is the same or different and represents 0 or 1, Y in each occurrence is the same or different and represents an absent group, oxygen, NH, and/or NR$^3$, and V in each occurrence is the same or different and represents —(CH$_2$)$_x$—,

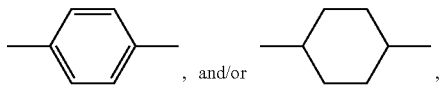

wherein
x in each occurrence is the same or different and represents an integer from 1 to 6; and optionally
b) 97 to 3 mol-% of a macromonomeric structural unit of formula (II)

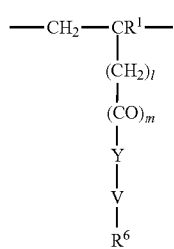

(II)

wherein
R$^1$, l, m, Y, and V have the meanings given above,
R$^6$ in each occurrence is the same or different and represents a polyoxyalkylene group of the following formula (IIa)

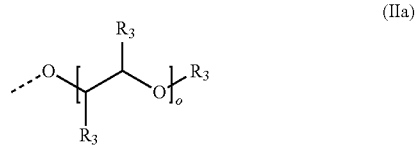

(IIa)

wherein
o in each occurrence is the same or different and represents an integer from 1 to 300, and
R$^3$ has the meaning given above; and
(ii) at least one inorganic binder mixture comprising
(iia) at least one inorganic binder selected from the group consisting of latent hydraulic binders, pozzolanic binders and mixtures thereof, and
(iib) at least one alkaline activator selected from the group consisting of alkali metal hydroxides, alkali metal carbonates, alkali metal aluminates, alkali metal silicates, and mixtures thereof;
wherein
the components are present separately; or
the components are present in a mixture.

14. The composition according to claim 13, wherein the composition further comprises at least one additive selected from the group consisting of fillers, accelerators, retarders, further rheology modifiers, superplasticizers, fibers, pigments and anionic, further cationic and/or non-ionic surfactants.

15. A geopolymer foam formulation comprising
(i) at least one cationic copolymer (i) comprising
a) 3 to 97 mol-% of a cationic structural unit of formula (I)

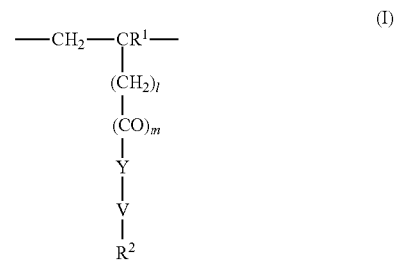

(I)

wherein
R$^1$ in each occurrence is the same or different and represents hydrogen and/or methyl,
R$^2$ in each occurrence is the same or different and is selected from the group consisting of

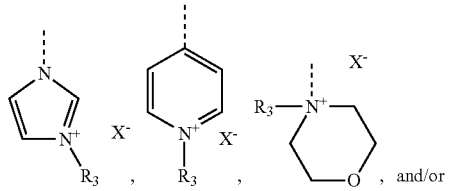

, and/or

-continued

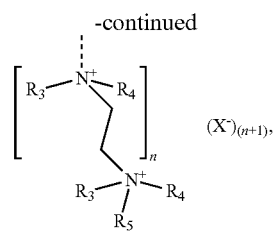

wherein
R³, R⁴, and R⁵ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety, X in each occurrence is the same or different and represents a halogen atom, a $C_1$-$C_4$-alkyl sulfate, a $C_1$-$C_4$-alkyl sulfonate, a $C_6$-$C_{14}$-(alkyl) aryl sulfonate and/or a monovalent equivalent of a polyvalent anion, which is selected from a sulfate, a disulfate, a diphosphate, a triphosphate, and/or a polyphosphate, and n in each occurrence is the same or different and represents an integer from 0 to 10, from 0 to 2, l in each occurrence is the same or different and represents an integer m in each occurrence is the same or different and represents 0 or 1, Y in each occurrence is the same or different and represents an absent group, oxygen, NH, and/or NR³, and V in each occurrence is the same or different and represents —(CH₂)ₓ—,

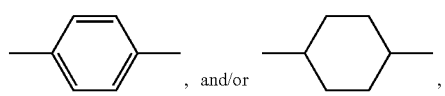, and/or wherein
x in each occurrence is the same or different and represents an integer from 0 to 6; and optionally b) 97 to 3 mol-% of a macromonomeric structural unit of formula (II)

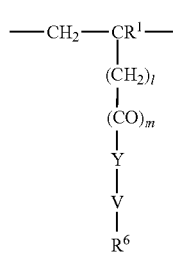

wherein
R¹ has the meaning given above,
R⁶ in each occurrence is pyrrolidone and/or caprolactam, and
l, m, Y and V are 0 or absent groups;

(ii) at least one inorganic binder mixture comprising
(iia) at least one inorganic binder selected from the group consisting of latent hydraulic binders, pozzolanic binders and mixtures thereof, and
(iib) at least one alkaline activator selected from the group consisting of alkali metal hydroxides, alkali metal carbonates, alkali metal aluminates, alkali metal silicates, and mixtures thereof; and
(iii) water.

16. A composition for preparing a geopolymer foam formulation comprising as components
(i) at least one cationic copolymer (i) comprising
a) 3 to 97 mol-% of a cationic structural unit of formula (I)

$$-CH_2-CR^1-$$
$$(CH_2)_l$$
$$(CO)_m$$
$$Y$$
$$V$$
$$R^2$$

wherein
R¹ in each occurrence is the same or different and represents hydrogen and/or methyl,
R² in each occurrence is the same or different and is selected from the group consisting of

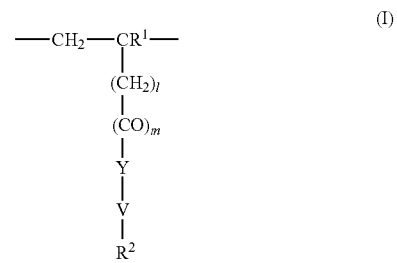, and/or

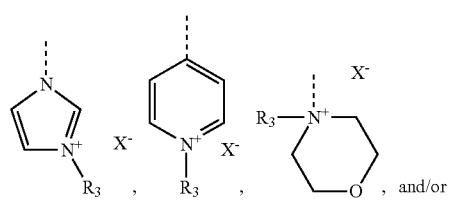

wherein
R³, R⁴, and R⁵ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety, X in each occurrence is the same or different and represents a halogen atom, a $C_1$-$C_4$-alkyl sulfate, a $C_1$-$C_4$-alkyl sulfonate, a $C_6$-$C_{14}$-(alkyl) aryl sulfonate and/or a monovalent equivalent of a polyvalent anion, which is selected from a sulfate, a disulfate, a diphosphate, a triphosphate, and/or a polyphosphate, and n in each occurrence is the same or different and represents an integer from 0 to 10, l in each occurrence is the same or different and represents an integer from 0 to 2, m in each occurrence is the same or different and represents 0 or 1, Y in each occurrence is the same or different and represents an absent group, oxygen, NH, and/or $NR^3$, and V in each occurrence is the same or different and represents —$(CH_2)_x$—,

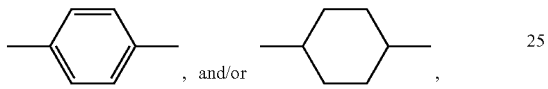

wherein x in each occurrence is the same or different and represents an integer from 0 to 6; and optionally b) 97 to 3 mol-% of a macromonomeric structural unit of formula (II)

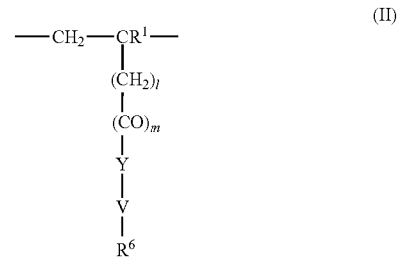

wherein
$R^1$ has the meaning given above,
$R^6$ in each occurrence is pyrrolidone and/or caprolactam, and
l, m, Y and V are 0 or absent groups; and (ii) at least one inorganic binder mixture comprising
(iia) at least one inorganic binder selected from the group consisting of latent hydraulic binders, pozzolanic binders and mixtures thereof, and
(iib) at least one alkaline activator selected from the group consisting of alkali metal hydroxides, alkali metal carbonates, alkali metal aluminates, alkali metal silicates, and mixtures thereof;

wherein
the components are present separately; or
the components are present in a mixture.

* * * * *